United States Patent
Franchi et al.

(10) Patent No.: US 10,474,447 B2
(45) Date of Patent: Nov. 12, 2019

(54) METHOD FOR MANAGING A PACKAGE IN A SECURE ELEMENT

(71) Applicant: GEMALTO SA, Meudon (FR)

(72) Inventors: Christophe Franchi, Gemenos (FR); François-Xavier Marseille, Gemenos (FR); Fabrice Vergnes, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 15/779,983

(22) PCT Filed: Nov. 29, 2016

(86) PCT No.: PCT/EP2016/079062
§ 371 (c)(1),
(2) Date: May 30, 2018

(87) PCT Pub. No.: WO2017/093207
PCT Pub. Date: Jun. 8, 2017

(65) Prior Publication Data
US 2018/0357059 A1    Dec. 13, 2018

(30) Foreign Application Priority Data
Dec. 4, 2015 (EP) .................................... 15306927

(51) Int. Cl.
*G06F 8/65* (2018.01)
*G06F 16/23* (2019.01)

(52) U.S. Cl.
CPC ............ *G06F 8/65* (2013.01); *G06F 16/2365* (2019.01)

(58) Field of Classification Search
CPC ...... G06F 8/65; G06F 17/30371; G06F 21/57; G06F 16/23
See application file for complete search history.

(56) References Cited

U.S. PATENT DOCUMENTS

| | | | |
|---|---|---|---|
| 2002/0093856 A1* | 7/2002 | Baentsch | G06F 9/44589 365/200 |
| 2003/0028686 A1* | 2/2003 | Schwabe | G06F 9/44521 719/332 |
| 2003/0042318 A1 | 3/2003 | Krishna et al. | |
| 2005/0097550 A1 | 5/2005 | Schwabe et al. | |
| 2007/0169043 A1* | 7/2007 | Violleau | G06F 9/526 717/149 |
| 2009/0290704 A1* | 11/2009 | Cimino | G06Q 20/3552 380/28 |

(Continued)

OTHER PUBLICATIONS

International Search Report (PCT/ISA/210) dated Feb. 10, 2017, by the European Patent Office as the International Searching Authority for International Application No. PCT/EP2016/079062.

(Continued)

*Primary Examiner* — Ziaul A Chowdhury
(74) *Attorney, Agent, or Firm* — Buchanan Ingersoll & Rooney PC

(57) ABSTRACT

The invention is a method of managing a package in a secure element comprising an initial operating system. The method comprises a step of updating the initial operating system to generate an updated operating system and a step of linking the package to the updated operating system. The linking step is automatically triggered by the step of updating the initial operating system.

5 Claims, 2 Drawing Sheets

(56) References Cited

U.S. PATENT DOCUMENTS

| | | | | |
|---|---|---|---|---|
| 2011/0126183 A1* | 5/2011 | Bernard | | G06F 8/65 717/168 |
| 2013/0227646 A1* | 8/2013 | Haggerty | | H04L 63/0853 726/3 |
| 2013/0318355 A1* | 11/2013 | Girard | | H04W 4/70 713/175 |
| 2014/0019760 A1* | 1/2014 | Vergnes | | H04L 63/0823 713/175 |
| 2014/0025940 A1* | 1/2014 | Giraud | | G06F 21/51 713/2 |
| 2014/0058937 A1* | 2/2014 | Watson | | G06Q 20/204 705/41 |
| 2014/0089261 A1* | 3/2014 | Aissi | | G06F 11/1461 707/621 |
| 2014/0099925 A1* | 4/2014 | Schell | | H04L 63/0853 455/411 |
| 2014/0130151 A1* | 5/2014 | Krishnamurthy | | G06F 8/65 726/22 |
| 2015/0172255 A1* | 6/2015 | Warnez | | G06F 8/65 713/168 |
| 2015/0193221 A1* | 7/2015 | Khan | | G06F 8/65 713/176 |
| 2015/0193224 A1* | 7/2015 | Ziat | | G06F 8/65 717/172 |
| 2015/0220729 A1 | 8/2015 | Rudolph et al. | | |
| 2016/0054989 A1* | 2/2016 | Diebolt | | G06F 8/61 717/177 |
| 2016/0330175 A1* | 11/2016 | Li | | G06F 8/65 |
| 2017/0289115 A1* | 10/2017 | Lessiak | | G06F 8/65 |

OTHER PUBLICATIONS

Written Opinion (PCT/ISA/237) dated Feb. 10, 2017, by the European Patent Office as the International Searching Authority for International Application No. PCT/EP2016/079062.

\* cited by examiner

METHOD FOR MANAGING A PACKAGE IN A SECURE ELEMENT

FIELD OF THE INVENTION

The present invention relates to methods of managing a package in a secure element. It relates particularly to methods of handling a package when the operating system of the secure element is updated.

BACKGROUND OF THE INVENTION

Secure elements are small devices comprising a memory, a microprocessor and an operating system for computing treatments. Such secure elements may comprise a plurality of memories of different types, like non-volatile memory and volatile memory. They are called "secure" because they are able to control the access to the data they contain and to authorize or not the use of data by other machines. The secure elements may also provide computation services based on cryptographic components. In general, secure elements have limited computing resources and limited memory resources and they are intended to be connected to a host machine which provides them with electric power. Secure elements may be removable or fixed to a host machine. For example, smart cards are a kind of secure elements.

A secure element may contain applications and their associated applicative data which encompass user data, file systems and secret key. Such an application may be developed as a package or a set of packages which is stored into the secure element. One or several instances of the application are then created as needed. Each instance owns, handles and store its own instance data.

Secure elements may be accessed by a remote server via a wireless channel or through a wired network, like Internet for instance. For example, secure elements which are intended to be used in Telecom domain or Machine-To-Machine (M2M) domain are able to manage an OTA (Over-The-Air) channel. These secure elements may also be accessed through the HyperText Transfer Protocol, usually called HTTP or HTTPS for the secure mode. Thus, a distant server can remotely manage the content of a secure element like an UICC (Universal Integrated Circuit Card) through a dedicated communication session using a specific protocol. For example, the server may use the RAM (Remote Applet Management) mechanism as defined by GlobalPlatform v 2.2 standard—Amendment B "RAM over HTTP" or the OMA-DM (Open Mobile Alliance—Device Management) protocol as defined by OMA-TS-DM V1.2.1 standard.

According to JavaCard™ specifications, a package may be loaded in a secure element through a Converted Applet file (herein referred to as "CAP file"). The package installation comprises a step of linking the package to the operating system. This linking step allows to map symbolic addresses used in the CAP file into physical addresses depending on the current operating system. This linking step is carried out only once in the secure element then several components (Header, Directory, Import, Constant Pool and Reference Location components) of the CAP file are deleted. This allows fast execution at runtime and memory saving.

A remote server can send a new version or an upgrade of the operating system of the secure element. In this case, the packages linked to the previous operating system are deleted then reloaded in the secure element. This new loading of packages triggers the re-installation of these packages which in turn triggers the linking of these packages to the new operating system.

The re-loading of a package may require a large part of the bandwidth on the network. This problem is exacerbated when a large number of secure elements must be upgraded. Moreover, the remote server may have no access to the relevant package if this package has been installed by another entity like a third party.

There is a need for allowing to maintain a package in a functional state when the operating system of a secure element is updated.

SUMMARY OF THE INVENTION

An object of the invention is to solve the above mentioned technical problem.

The object of the present invention is a method for managing a package in a secure element comprising an initial operating system. The method comprises a step of updating the initial operating system to generate an updated operating system. The method comprises the step of linking the package to the updated operating system, the linking step being triggered by the step of updating the initial operating system.

Advantageously, the package may be created from a CAP file previously downloaded in the secure element. The CAP file may comprise a plurality of components. The method may comprise the step of selecting, from the plurality of components, items that are required to retrieve references to be updated during the linking step and permanently storing said items in the secure element. The method may comprise the step of removing at least one component of the CAP file from the secure element.

Advantageously, said items may be related to targets external to the package.

Advantageously, the CAP file may comprise an Import component, a Constant Pool component, a Reference Location component, a Class component and a Method component. Said items may be selected from said Import, Constant Pool, Reference Location, Class and Method components.

Advantageously, the package may comprise both its own Class component and its own Method component and said linking step may comprise the following sub-steps:
  processing the Import component to check consistency of the package with the updated operating system, and in case of successful consistency checking, using said items to:
  resolve each external reference of the Class component of the package, and
  resolve each external reference of the Method component of the package.

Advantageously, said items may be permanently stored in the secure element in a format different from that of the CAP file.

Another object of the invention is a secure element comprising a package and an initial operating system. The secure element comprises a first agent adapted to generate an updated operating system by updating the initial operating system. The secure element comprises a second agent adapted to link the package to the updated operating system. The first agent is adapted to trigger the linking of the package at the end of the updating of the initial operating system.

Advantageously, the package may be created from a CAP file previously downloaded in the secure element. The CAP file may comprise a plurality of components. The secure element may comprise a third agent adapted to select, from said plurality of components, items that are required to retrieve references to be updated during the linking step, to permanently store said items in the secure element and to remove at least one component of the CAP file from the secure element.

Advantageously, the CAP file may comprises an Import component, a Constant Pool component, a Reference Location component, a Class component and a Method component and said third agent may be adapted to select said items from said Import, Constant Pool, Reference Location, Class and Method components.

Advantageously, the package may comprise both its own Class component and its own Method component. The second agent may be adapted to:
 process data belonging to said items and coming from the Import component to check consistency of the package with the updated operating system, and in case of successful consistency checking using said items to:
  resolve each external reference of the Class component of the package, and
  resolve each external reference of the Method component of the package.

Advantageously, the third agent may be adapted to permanently store said items in the secure element in a format different from that of the CAP file.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of secure element intended to embed packages and an operating system which may be upgraded when deployed on the field. Such secure elements may be coupled to a host machine like a smartphone, a smart watch, a vehicle, a meter, a slot machine, a TV or a computer.

In the present description, a package is a container as defined by object-oriented programming languages. In particular, the invention applies to packages as defined in Java™ and JavaCard™ languages.

Figure 1:
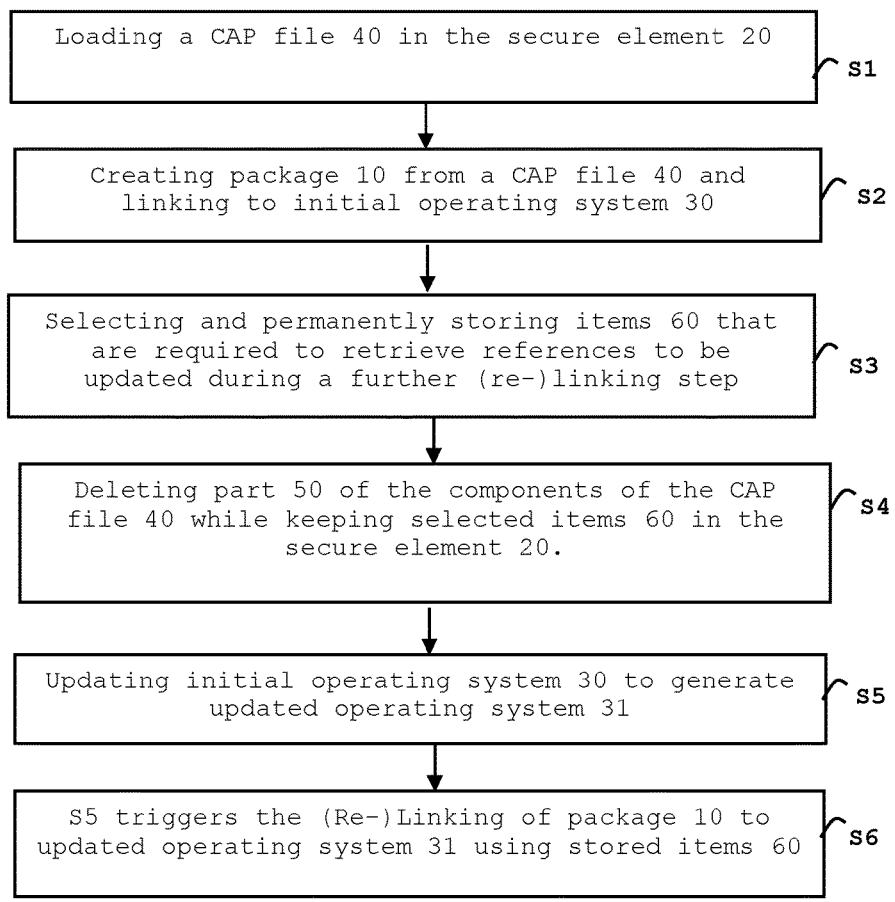
FIG. 1 shows an exemplary flow diagram of package managing in a secure element according to the invention.

FIG. 1 shows an example of a flow diagram for managing a package when the operating system of a secure element is upgraded according to the invention.

A secure element 20 is supposed to have been issued with an original operating system 30. For example, this original operating system 30 may comprise an object-oriented virtual machine and high level Application programming Interfaces (APIs). For instance, the virtual machine (VM) may be compliant with JavaCard™ specifications version 2.2 or upper.

At step S1, a CAP file 40 containing components allowing to create a package 10 is downloaded in the secure element 10. The package 10 may be required to install an application into the secure element 10 for instance.

At step S2, the package 10 is installed in the secure element. In other words, the package 10 is created from the components of the CAP file 40 then the package 10 is linked to the initial operating system 30. In one embodiment, the CAP file may be processed on-the-fly when loaded in the secure element. Components of the CAP file may be temporary stored so that the CAP file (as such) is no more existing on the secure element once the package is fully created.

The package installation operation triggers the step S3 where the secure element 10 selects items 60 from several components of the CAP files 40 (before possible CAP file erasing). Preferably, these items 60 are extracted from the following component list: Import 51, Constant Pool 52, Reference Location 53, Class 54 and Method 55.

These items 60 are required to retrieve all references of the Class component and the Method component that need to be updated during a further linking (i.e. re-linking) operation.

These items 60 are permanently stored in the secure element 20. For instance, items 60 are stored in a non-volatile memory of the secure element 20. In the present description, "permanently stored" means that the items are kept in the secure element 20 for a long time. For example, these items are kept until the package 10 is removed from the secure element 20.

Preferably, these items are stored in a customized format which is different from the format of the CAP file so as to minimize their footprint or to ease their parsing.

In one embodiment, the items 60 are selected so that they refer to references external to the package 10 only. In other word, the selected items 60 are not intended to be used for solving the references which are internal to the package 10. Alternatively, items 60 may be selected so that they refer to both references external to the package and references internal to the package.

Although steps S2 and S3 have been described as two distinct steps they may be considered as a single step. For example, the following new structure may be used to store information which allows to establish a link between the Method component and a Constant Pool component customized for storage of a subset of items 60. This storage format allows to resolve references of the Method component:

```
relink_component {
    u16 ref_count;
    ref_info ref_infos[ref_count];
}
ref_info {
    u16 offset_in_method_component;
    u16 index_in_constant_pool;
}
```

In order to illustrate the items which are extracted from the original components (of the CAP file), the Import component which is originally structured as follows:

```
import_component {
    u1 tag
    u2 size
    u1 count
    package_info packages[count]
}
``` may be kept in the following format:

```
import_component_Kept {
    u1 count
    package_info packages[count]
}
```

When loading a CAP file, Class component is usually fully kept. However several data of the Class component are linked to the Operating System and then their original values are no more retained. According to an example of the invention, the new process extracts the data (with their original value) that will have to be re-linked later.

For example, the Class component may be originally structured as follows:

```
class_component {
    u1 tag
    u2 size
    u2 signature_pool_length
    type_descriptor signature_pool[ ]
    interface_info interfaces[ ]
    class_info classes[ ]
}
``` wherein the "interface info" and the "class info" are initially structured as follows:

```
interface_info {
    u1 bitfield {
        bit[4] flags
        bit[4] interface_count
    }
    class_ref superinterfaces[interface_count]
    interface_name_info interface_name
}
and
class_info {
    u1 bitfield {
        bit[4] flags
        bit[4] interface_count
    }
    class_ref super_class_ref
    u1 declared_instance_size
    u1 first_reference_token
    u1 reference_count
    u1 public_method_table_base
    u1 public_method_table_count
    u1 package_method_table_base
    u1 package_method_table_count
    u2
public_virtual_method_table[public_method_table_count]
    u2
package_virtual_method_table[package_method_table_count
]
    implemented_interface_info
interfaces[interface_count]
    remote_interface_info remote_interfaces
}
``` and are kept on the following structures so that external references are extracted and stored for a further relink:

```
interface_info_kept {
    class_ref superinterfaces[interface_count]
}
and
class_info_kept {
    class_ref super_class_ref
    u1 declared_instance_size
    u1 first_reference_token
```

```
    u2
public_virtual_method_table[public_method_table_count]
    implemented_interface_info
interfaces[interface_count]
}
```

At step S4, the secure element 20 deletes part 50 of the CAP file components while keeping the selected items 60 in the secure element 20. For example, the following components are removed from the secure element 20: Header and Directory. In other words, the secure element 20 does not keep any information coming from these deleted components.

A CAP file may contain custom components which are usually kept, they can be also updated. Since these custom components are OS issuer dependent, there is no general rules to manage them. The optional Descriptor component is intended to be used if the on-board byte code verification is active. Consequently, the Descriptor component may be kept for the bytecode checking during runtime.

At step S5, an upgrade is applied to the original operating system 30 to generate a new (updated) operating system 31.

In a first example, the step S5 is carried out via a bootloader agent which is designed to administrate the operating system of the secure element 20. In this case, the updated Operating system 31 is fully sent to the secure element 20.

In this case, the bootloader is activated so that the behavior of the secure element 20 does not rely on the original operating system 30. Then the new operating system 31 is downloaded and in the secure element 20 via the bootloader. Then an activation command is sent to the secure element to switch from bootloader mode to the new operating system 31 mode and a further reset (i.e. hardware reboot) is applied to the secure element so that the secure element takes the new operating system 31 into account by starting the new operating system 31. In this example, the step S5 of updating the initial operating system 30 consists of the combination of execution of both the activation command and the reset.

In a second example, the step S5, may be carried out by downloading a bulk of data aiming at slightly modify the initial operating system (like a corrective patch or a new feature). In this case, the new/updated feature is active as soon as installed in the secure element (e.g. without requiring a reset). In this example, the step S5 of updating the initial operating system 30 consists of the installation of the new/updated feature.

It is to be noted that in all cases, the re-linking operation is performed when the updated operating system 31 is active on the secure element 20.

The end of the step S5 triggers the step S6 where a new linking (also named re-linking) operation of the package 10 to the updated operating system 31 is started. This re-linking operation is carried out using the stored items 60.

In other words, the re-linking step is automatically triggers by the end of the step S5 and is carried out using data permanently stored in the secure element. Preferably, the re-linking step is executed as soon as the step S5 is finished (i.e. directly executed). Alternatively, intermediate operations may occur between the end of the step S5 and the re-linking step.

Preferably, the items 60 which are permanently stored according to the invention, remain unchanged after the re-linking step so that a further re-linking step can be performed again after another operating system update.

Preferably, the re-linking operation of step S6 is carried out as follows.

First, the secure element 20 checks consistency (i.e. compatibility) of the package 10 with the updated operating system 31 thanks to items coming from the Import 51 component. This checking aims at controlling that the package is still compliant with the features of the updated operating system 31. In case of error, the re-linking operation aborts. In case of successful consistency checking, the secure element 20 resolves each external reference of the Class component of the package 10 using the stored items 60 and resolves each external reference of the Method component of the package 10 using the stored items 60.

Additionally, the secure element 20 may also resolve internal references of the Class component of the package 10 and the Method component of the package 10 using the stored items 60.

It is to be noted that the package re-linking process is applied to all packages previously installed in the secure element provided that these packages are compatible with the updated operating system.

Figure 2:
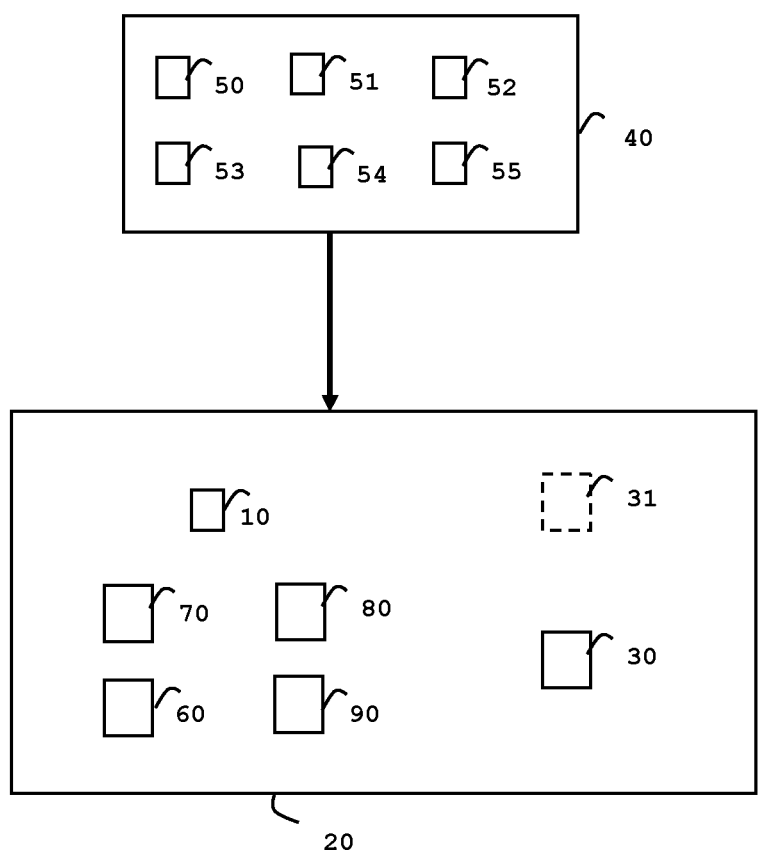
FIG. 2 shows a diagram of a secure element according to an example of the invention.

FIG. 2 shows an example a CAP file and a diagram of a secure element according to an example of the invention.

A package 10 is then created in the secure element 20 from the CAP file 40. The secure element 20 includes an original operating system 30 and is intended to comprise an updated operating system 31 (shown in dashed line). The updated operating system 31 is assumed to be an upgraded version of the original operating system 30.

In this example, the secure element 20 is a smart card comprising a communication interface (not shown) configured to exchange data with the outside according to ISO-7816 standards.

Both the original operating system 30 and the updated operating system 31 comprise a JavaCard™ virtual machine VM.

The secure element contains first software agent 70 which is configured to update the original operating system 30 to generate the updated operating system 31. The first software agent 70 is able to get a bulk of data coming from a distant machine and to update the original operating system 30 using the received data.

The secure element 20 comprises a second software agent 80 which is configured to link the package 10 to the updated operating system 31. The first agent 70 is configured to automatically trigger the second agent 80 for starting a (re-)linking of the package 10 at the end of the generation of the updated operating system 31.

The secure element 20 comprises a third software agent 90 which is configured to select, from the plurality of components of the CAP file 40, items 60 that are required to retrieve references to be updated during the (re-)linking step. The third software agent 90 is also configured to permanently store these items 60 in the secure element 20 and to remove at least one component 50 of the CAP file 40 from the secure element 20. Preferably, the third software agent 90 which is configured to extract these items 60 from the following components of the CAP file 40: the Import component 51, the Constant Pool component 52, the Reference Location component 53, the Class component 54 and the Method component 55.

Preferably, the third software agent 90 is adapted to remove the Header and Directory components (of the CAP file 40) from the secure element 20. The third software agent 90 may be configured to remove all the components of the CAP file 40, assuming that the selected items 60 are kept in the secure element 20 in another storage format.

The package 10 is assumed to comprise both its own Class component and its own Method component which may be stored in the secure element 20 according to any storage mechanism.

In the example of FIG. 2, the second agent 80 is designed to process items coming from the Import component 51 to check if the package 10 is compatible with the updated operating system 31. In case of successful consistency (compatibility) checking, the second agent 80 is designed to resolve all external references of the Class component of the package 10 using the items 60 and to resolve all external references of the Method component of the package 10 using the items 60.

Thanks to the invention it is possible to easily and smoothly manage the migration of existing packages when the operating system is updated, by automatically maintaining alive the packages already installed in the 20. Thus the updating operation of the operating system can be performed in a transparent way for the user who keep a full continuity of service since the packages (and their related applications) remain functional.

The invention is not limited to the described embodiments or examples. In particular, the secure element may comprise several packages which are automatically re-linked as soon as the operating system is updated.

It is to be noted that the invention applies to package even if no application is instantiated from the package. The invention applies API (Application Programming Interface) package.

The invention claimed is:

1. A method for managing a package in a secure element comprising an initial operating system, wherein the package is created from a Converted Applet (CAP) file comprising a plurality of components and previously downloaded in the secure element, wherein the CAP file comprises an Import component, a Constant Pool component, a Reference Location component, a Class component and a Method component, and wherein the method comprises:

a step of linking said package to said initial operating system, wherein the package comprises both its own Class component and its own Method component, wherein said linking step comprises the following sub-steps:
processing the Import component to check consistency of the package with the updated operating system, and in case of successful consistency checking to:
resolve each external reference of the Class component of the package, and
resolve each external reference of the Method component of the package,
a step of selecting, from said plurality of components, items that are required to retrieve references to be updated during a re-linking operation and permanently storing said items in the secure element, said items are selected from said Import, Constant Pool, Reference Location, Class and Method components,
a step of removing at least one component of the CAP file from the secure element,
a subsequent step of updating the initial operating system to generate an updated operating system,
a subsequent step of re-linking the package to the updated operating system, said re-linking step being triggered by the step of updating the initial operating system and being carried out using said stored items.

2. A method according to claim 1, wherein said items are related to targets external to the package.

3. A method according to claim 1, wherein said items are permanently stored in the secure element in a format different from that of the CAP file.

4. A secure element comprising:
a microprocessor;
one or more memories;
a package and an initial operating system, said package having been previously linked to said initial operating system said secure element comprising a first agent when executed in the microprocessor generates an updated operating system by updating the initial operating system, wherein said secure element comprises a second agent when executed in the microprocessor performs a re-linking operation of said package to the updated operating system, wherein said first agent is when executed in the microprocessor triggers the re-linking of the package at the end of the updating of the initial operating system,
wherein
the package is created from a Converted Applet (CAP) file previously downloaded in the secure element, said CAP file comprising a plurality of components including an Import component, a Constant Pool component, a Reference Location component, a Class component and a Method component, said package comprises both its own Class component and its own Method component,
said secure element comprises a third agent when executed in the microprocessor selects, from said plurality of components, items that are required to retrieve references to be updated during the re-linking operation to permanently store said items in the secure element and to remove at least one component of the CAP file from the secure element, wherein said items are selected from said Import, Constant Pool, Reference Location, Class and Method components, and
said second agent executes said re-linking operation using said stored items, said re-linking operation including processing the Import component to check consistency of the package with the updated operating system, and in case of successful consistency checking, using said items to: resolve each external reference of the Class component of the package, and resolve each external reference of the Method component of the package.

5. A secure element according to claim 4 wherein said third agent is executed in the microprocessor to permanently store said items in the secure element in a format different from that of the CAP file.

* * * * *